(No Model.)
O. B. SHALLENBERGER.
SYSTEM OF ELECTRICAL DISTRIBUTION.
No. 487,543. Patented Dec. 6, 1892.
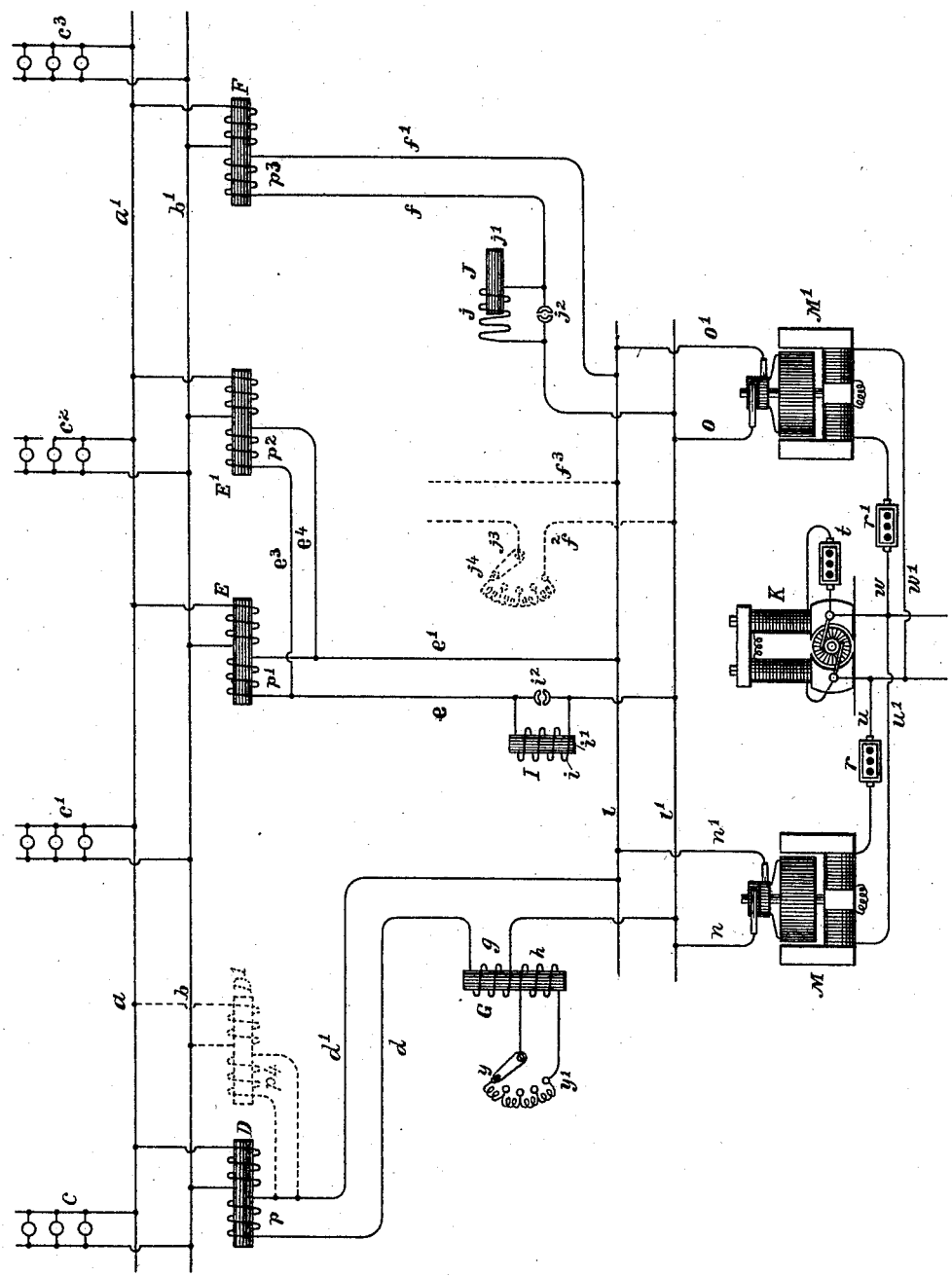
Witnesses
J. W. Smith.
George Brown Jr.
Inventor
Oliver B. Shallenberger.
By his Attorney
Charles A. Terry.

United States Patent Office.

OLIVER B. SHALLENBERGER, OF ROCHESTER, ASSIGNOR, BY MESNE ASSIGNMENTS, TO THE WESTINGHOUSE ELECTRIC AND MANUFACTURING COMPANY, OF PITTSBURG, PENNSYLVANIA.

SYSTEM OF ELECTRICAL DISTRIBUTION.

SPECIFICATION forming part of Letters Patent No. 487,543, dated December 6, 1892.

Original application filed October 12, 1886, Serial No. 215,992. Divided and this application filed January 9, 1890. Serial No. 336,407. (No model.) Patented in England July 12, 1887, No. 9,735; in France July 12, 1887, No. 184,765; in Belgium July 12, 1887, No. 78,180, and in Canada November 10, 1887, No. 27,971.

*To all whom it may concern:*

Be it known that I, OLIVER B. SHALLENBERGER, a citizen of the United States, residing at Rochester, in the county of Beaver and State of Pennsylvania, have invented a certain new and useful Improvement in Systems of Electrical Distribution, (Case No. 367,) of which the following is a specification, being a division of an application filed by me October 12, 1886, No. 215,992, (for which I have obtained Letters Patent in England, No. 9,735, dated July 12, 1887; in France, No. 184,765, dated July 12, 1887; in Belgium, No. 78,180, dated July 12, 1887, and in Canada, No. 27,971, dated November 10, 1887.)

This invention relates especially to the class of circuits and apparatus employed for utilizing alternating electric currents for electric lighting and similar purposes.

The object of the invention is primarily to secure convenient and effective means for regulating the supply of current.

It is customary to supply an alternating current from a generator of suitable character and conduct it through one or more pairs of leads to points near where it is to be utilized and there convert it into a similar current of different potential. This converted current is then delivered upon main conductors and employed in operating suitable translating devices, such as incandescent electric lights, for instance.

The invention consists in employing several leads running to different converters along the length of the main and in placing in each of the leads a regulating device—such, for instance, as a converter having its primary coil included in the lead and its secondary coil connected through an adjustable resistance-circuit. The necessity of some such device is found in the fact that as the translating devices are cut in and out of circuit at different points along the length of the main the potential at such points is varied. The current delivered at such point should then be varied that the potential throughout the main may be equalized.

In the accompanying drawing there is illustrated an organization of apparatus and a system of circuits adapted to carry out the invention.

Referring to the figure, M and M' represent two alternate-current generators having their field-magnets supplied by currents from a dynamo-electric generator K. The current of this generator may be regulated by an adjustable resistance $t$, included in circuit with the field-magnet coils. The current is led to the respective alternate-current generators through conductors $u\ u'$ and $w\ w'$. Adjustable resistances $r$ and $r'$ are included in the conductors $u$ and $w$, respectively, and by means of these the current supplied to the two generators M and M' may be equalized. The currents from the one or more generators M and M' are led to a supply-conductor $l\ l'$ by conductors $n\ n'$ and $o\ o'$, respectively.

The main conductors $a\ a'\ b\ b'$ are to be supplied at different points along their lengths by currents derived from converters D, E, E', and F. These have their primary coils $p, p', p^2$, and $p^3$ connected in circuit with the conductors $l\ l'$ in multiple arc. The coil $p$ is thus connected by conductors $d$ and $d'$. In the conductor $d$ there is included the primary coil $g$ of a converter G. The secondary coil $h$ has its terminals connected through an adjustable resistance $y\ y'$. This converter may be so proportioned that the current through the circuit $y\ y'$ will either be small with a high difference of potential or else large with a small difference of potential. With suitably-wound coils incandescent electric lamps may be used with advantage for the resistance. By the use of the converter it becomes unnecessary to handle the primary current and the secondary may be made of such small difference of potential that it may be handled with perfect safety.

The converter E has its primary coil $p'$ connected in circuit with the conductors $e$ and $e'$, and the converter E' has its primary coil $p^2$ connected in conductors $e^3$ and $e^4$, derived from the conductors $e$ and $e'$. This affords a convenient method of connecting two or more converters, located near each other, in circuit where it is desired to economize the leads. The converter F is in like manner connected in circuit by the conductors $f$ and $f'$. The secondary coils in each instance have their respective terminals connected with the conductors $a\ a'$ and $b\ b'$. In the conductors $e$ and $f$ there may be placed converters similar to the converter G or resistances such as shown at I and J. These are simple inductive resistances consisting of adjustable cores $i'$ and $j'$, surrounded, respectively, by coils $i$ and $j$. The cores may be withdrawn a greater or less distance, as required, or they may be entirely short-circuited by switch-plugs at $i^2$ and $j^2$.

The incandescent electric lights or other translating devices are represented at $c\ c'\ c^2\ c^3$. They are connected in circuit in the usual manner, and when all are in circuit or the system is operating under normal conditions the full amount of current traverses each set of leads or feeders $d\ d'$, $e\ e'$, and $f\ f'$, the equalizers being short-circuited. This would be accomplished in the case of the device G by short-circuiting the secondary coil, and in the devices I and J by means of the switch-plug. If now the load diminishes toward the end $a\ b$, the loss in the feeders $d\ d'$ would decrease and the difference of potential would rise in that portion higher than toward the end $a'\ b'$. Resistance would then be introduced into the secondary circuit $h$ of the induction coil or converter G, and thereby the difference of potential between the terminals of the primary coils $g$ would be increased. In this manner the difference of potential in the portion $a\ b$ of the work circuit would be reduced and made equal to that through the portion $a'\ b'$.

There is shown in dotted lines at $f^2\ f^3$ another set of leads or feeders provided with a simple resistance $j^4$, more or less of which may be insered in a conductor $f^2$ by means of a switch $j^3$. This form of resistance may be employed instead of the inductive resistance in some instances.

A converter D′, as shown in dotted lines, may be employed in connection with the converter D. The primary coils $p$ and $p^4$ are connected in series, and the secondary coils are connected in parallel to the conductors $a\ b$. This arrangement is adopted in cases when it is desired to carry a high difference of potential between the primary leads without unduly increasing the difference of potential between the terminals of any one converter. The converters so connected are supposed to be located near each other and suitably proportioned to effect the required ratio of conversion.

This specification is a division of the application filed by me October 12, 1886, Serial No. 215,992.

I claim as my invention—

1. The combination, substantially as described, of a source of electricity, two main lines, converters having their secondary coils connected with different points along the length of said main lines, conductors connecting the source of electricity with the primary coils of the respective converters, and one or more converters having their primary coils respectively included in the last-named conductors, and adjustable resistances included in the circuits of the secondary coils, substantially as described.

2. The combination, substantially as described, with two or more alternate-current generators, of a source of electrical current supplying the field-magnet coils of the same, conductors with which said generators are connected in multiple arc, a system of feeding-conductors connected therewith, translating devices, and a main line with which said translating devices are connected, and converters located along the main line, having their secondary coils connected therewith in multiple arc and their primary coils connected with the feeding-conductors aforesaid.

3. The combination, with a source of alternating-electric currents, of a main line, translating devices connected with the main line, converters located along the main line and independent conductors connecting the primary coils of the converters in multiple with the source, and conductors connecting the secondary coils in multiple with the main line, and an adjustable resistance in one of the primary circuits, consisting of two coils of wire and a core upon which they are wound, one coil being connected in the primary circuit and an adjustable variable resistance through which the terminals of the other coil are connected.

In testimony whereof I have hereunto subscribed my name this 24th day of December, A. D. 1889.

OLIVER B. SHALLENBERGER.

Witnesses:
S. R. ROSEMAND,
J. W. SMITH.